(12) United States Patent
Campbell et al.

(10) Patent No.: US 6,650,957 B1
(45) Date of Patent: Nov. 18, 2003

(54) METHOD AND APPARATUS FOR RUN-TO-RUN CONTROL OF DEPOSITION PROCESS

(75) Inventors: William Jarrett Campbell, Austin, TX (US); Thomas Sonderman, Austin, TX (US); Craig W. Christian, Buda, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 0 days.

(21) Appl. No.: 09/476,696

(22) Filed: Jan. 3, 2000

(51) Int. Cl.$^7$ ............................................. G06F 19/00
(52) U.S. Cl. ...................... 700/121; 700/110; 702/81
(58) Field of Search ................................ 700/106, 121, 700/110, 108, 97, 123; 702/81, 84; 432/14; 205/182

(56) References Cited

U.S. PATENT DOCUMENTS

| | | | | |
|---|---|---|---|---|
| 6,277,263 B1 | * | 8/2001 | Chen ........................... | 205/182 |
| 6,298,470 B1 | * | 10/2001 | Breiner et al. .................. | 716/4 |
| 6,388,253 B1 | * | 5/2002 | Su .............................. | 250/310 |
| 6,461,675 B2 | * | 10/2002 | Paranjpe et al. ............ | 427/250 |

OTHER PUBLICATIONS

Duane et al., Parctical Issues in Run by Run Process Control, 1995, Advance Semiconductor Manufacturing conference, IEEE/SEMI, pp. 201–208.*

James et al., Run by Run Control of Semiconductor Processes on the Production Floor, 1995, Electonics Munfacturing Tech. Symposium IEEE/CPMT, pp. 60–64.*

* cited by examiner

*Primary Examiner*—Leo Picard
*Assistant Examiner*—Kidest Bahta
(74) *Attorney, Agent, or Firm*—Williams, Morgan & Amerson, P.C.

(57) ABSTRACT

A method and an apparatus for controlling a deposition process in a manufacturing process. A process recipe setting step is performed. A process run of semiconductor devices is performed based upon the process recipe. Metrology data relating to the process run of semiconductor dev determination is made whether production results are within a predetermined tolerance level, based upon the metrology data. Process recipe settings are modified in response to a determination that the production results are within a predetermined tolerance level, based upon the metrology data. A processing tool is capable of receiving at least one control input parameter and a metrology data acquisition unit is interfaced with the processing tool and is capable of acquiring metrology data from the processing tool. A production data analysis unit is interfaced with the metrology data acquisition unit and is capable of analyzing the metrology data from the metrology data acquisition unit and a control input parameter adjustment unit is interfaced with the production data analysis unit and the processing tool and is capable of performing adjustments upon the control input parameter.

57 Claims, 6 Drawing Sheets

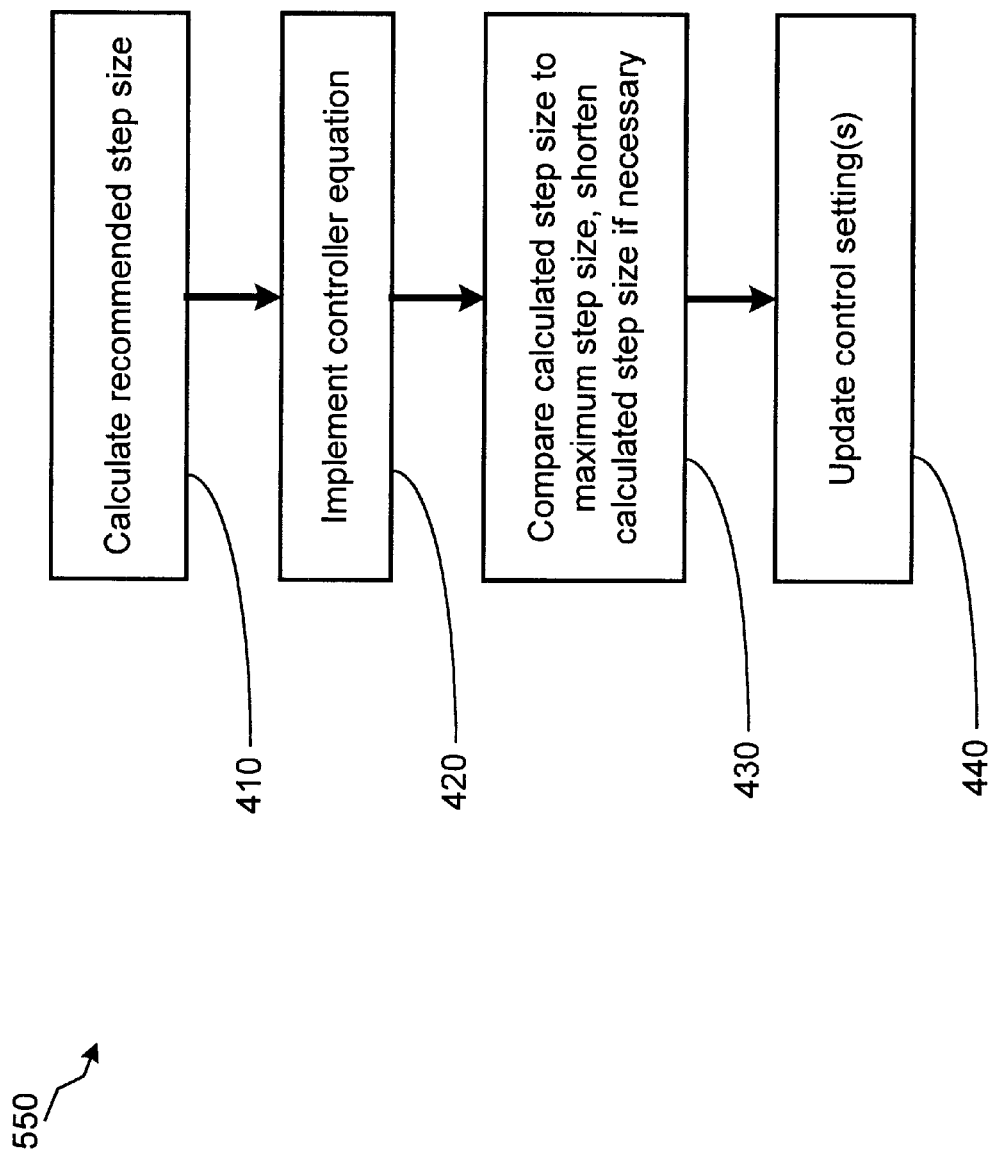

METHOD AND APPARATUS FOR RUN-TO-RUN CONTROL OF DEPOSITION PROCESS

BACKGROUND OF THE INVENTION

1. Field of the Invention

This invention relates generally to semiconductor products manufacturing, and, more particularly, to a method and apparatus for performing run-to-run control of a deposition process.

2. Description of the Related Art

The technology explosion in the manufacturing industry has resulted in many new and innovative manufacturing processes. Today's manufacturing processes, particularly semiconductor manufacturing processes, call for a large number of important steps. These process steps are usually vital, and therefore, require a number of inputs that are generally fine-tuned to maintain proper manufacturing control.

The manufacture of semiconductor devices requires a number of discrete process steps to create a packaged semiconductor device from raw semiconductor material. The various processes, from the initial growth of the semiconductor material, the slicing of the semiconductor crystal into individual wafers, the fabrication stages (etching, doping, ion implanting, or the like), to the packaging and final testing of the completed device, are so different from one another and specialized that the processes may be performed in different manufacturing locations that contain different control schemes. Among the important aspects in semiconductor device manufacturing are deposition process, implant process, RTA control, chemical-mechanical (CMT) control, and overlay control. Deposition process is one of several important steps in manufacturing of semiconductor devices, such as semiconductor wafers. In particular, deposition of copper in semiconductor substrates is an important deposition process. Generally, minimization of errors in the deposition of copper layers is important to ensure that the multiple layers of the semiconductor devices are connected and functional. As technology facilitates smaller critical dimensions for semiconductor devices, the need for reducing deposition errors increases dramatically.

Generally, deposition process engineers currently analyze the deposition errors at certain intervals. The results from the analysis of the deposition errors are used to make updates to deposition tool settings manually. Technical personal who are responsible for overseeing manufacturing processes generally make modification to a process tool, load a process recipe into the process tool, and check control parameters that are defined by the process recipe. Generally, a manufacturing model is employed to control the manufacturing processes. Some of the problems associated with the current methods include the fact that the aforementioned steps can be compromised by errors that can occur in each of the steps. Furthermore, currently, the deposition tool updates are performed manually or semi-automatically. Many times, errors in semiconductor manufacturing are not organized and reported to quality control personal. Often, the manufacturing models themselves incur bias errors that could compromise manufacturing quality.

Generally, a set of processing steps is performed on a lot of wafers on a semiconductor manufacturing tool called a deposition process tool. The manufacturing tool communicates with a manufacturing framework or a network of processing modules. The manufacturing tool is generally connected to an equipment interface. The equipment interface is connected to a machine interface to which the stepper is connected, thereby facilitating communications between the tool and the manufacturing framework. The machine interface can generally be part of an advanced process control (APC) system. The APC system initiates a control script based upon a manufacturing model, which can be a software program that automatically retrieves the data needed to execute a manufacturing process. Often, semiconductor devices are staged through multiple manufacturing tools for multiple processes, generating data relating to the quality of the processed semiconductor devices. Many times, errors in semiconductor manufacturing are not organized and reported to quality control personal, which can result in reduced efficiency in manufacturing processes. Errors in manufacturing model, errors in the recipe, errors in the species of the process control script, or mismatch of recipe to process tool can cause poor manufacturing results.

The present invention is directed to overcoming, or at least reducing the effects of, one or more of the problems set forth above.

SUMMARY OF THE INVENTION

In one aspect of the present invention, a method is provided for controlling a deposition process in a manufacturing process. A process recipe setting step is performed. A process run of semiconductor devices is performed based upon said process recipe. Metrology data relating to said process run of semiconductor devices is acquired. A determination is made whether production results are within a predetermined tolerance level, based upon said metrology data. Process recipe settings are modified in response to a determination that said production results are within a predetermined tolerance level, based upon said metrology data. Furthermore, the present invention is comprised of: a processing tool capable of receiving at least one control input parameter; a metrology data acquisition unit interfaced with said processing tool and capable of acquiring metrology data from said processing tool; a production data analysis unit interfaced with said metrology data acquisition unit and capable of analyzing said metrology data from said metrology data acquisition unit; and a control input parameter adjustment unit interfaced with said production data analysis unit and said processing tool and being capable of performing adjustments upon said control input parameter.

In another aspect of the present invention, an apparatus is provided for controlling a deposition process in a manufacturing process. The apparatus of the present invention comprises: a processing tool capable of receiving at least one control input parameter; a metrology data acquisition unit interfaced with said processing tool and capable of acquiring metrology data from said processing tool; a production data analysis unit interfaced with said metrology data acquisition unit and capable of analyzing said metrology data from said metrology data acquisition unit; and a control input parameter adjustment unit interfaced with said production data analysis unit and said processing tool and being capable of performing adjustments upon said control input parameter.

BRIEF DESCRIPTION OF THE DRAWINGS

The invention may be understood by reference to the following description taken in conjunction with the accompanying drawings, in which like reference numerals identify like elements, and in which:

FIG. 6 illustrates a flowchart representation of a more detailed depiction of the step of implementing a control input modification sequence described in FIG. 5.

Figure 1:
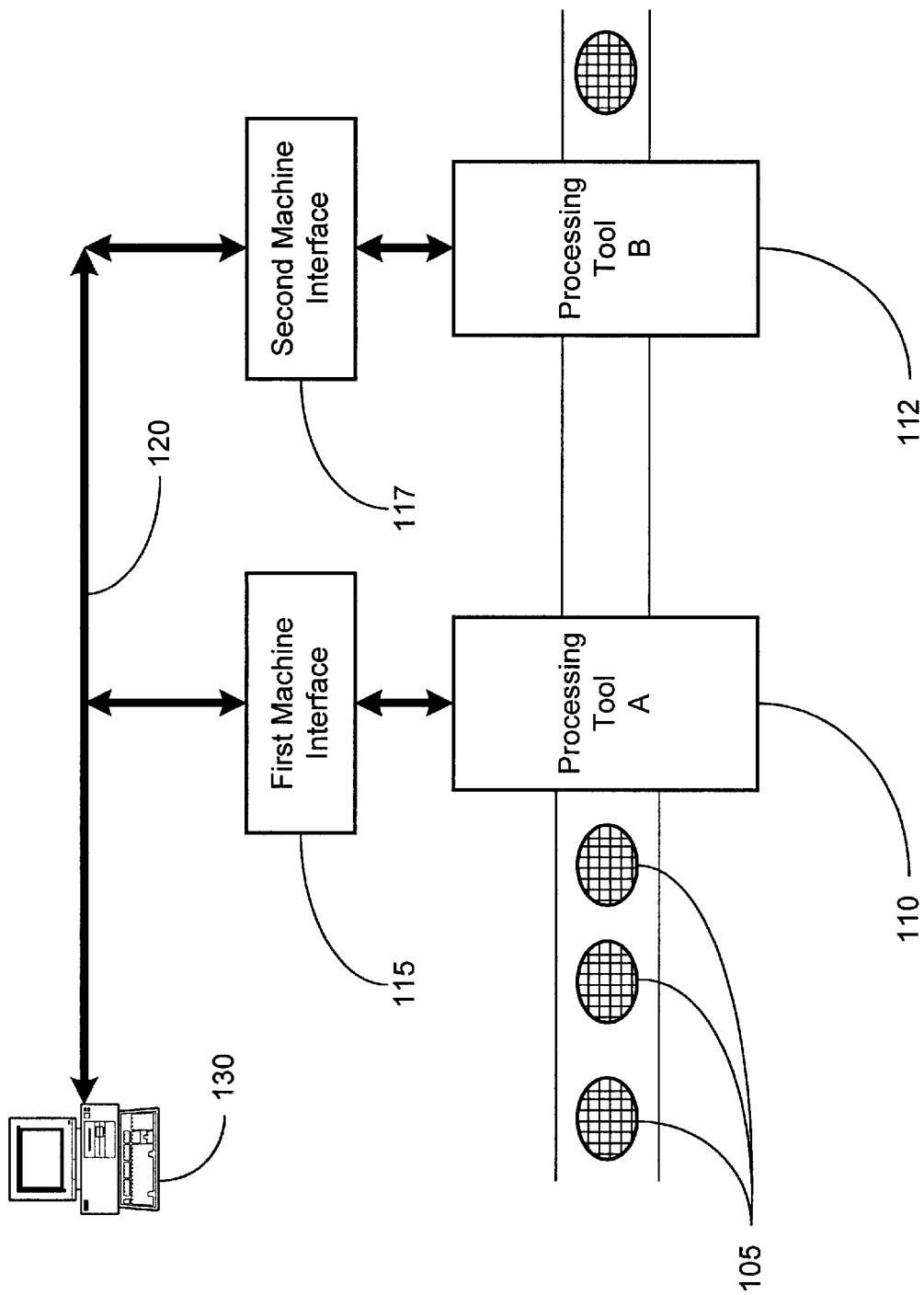
FIG. 1 illustrates one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

There are many discreet processes that are involved in semiconductor manufacturing. Many times, semiconductor devices are stepped through multiple manufacturing process tools. As semiconductor devices are processed through manufacturing tools, production data, or manufacturing data, is generated. The production data can be used to perform run-to-run control that can lead to improved manufacturing results. Deposition process is among the important groups of process step in semiconductor manufacturing. In particular, deposition of copper into semiconductor substrate is an important deposition process during semiconductor manufacturing processes. Improvements in deposition processes could result in substantial enhancements, in terms of quality and efficiency, in semiconductor manufacturing processes. In particular improved control of copper barrier layer deposition and seed layer deposition processes could lead to improved efficiency and accuracy processing of semiconductor devices. The present invention provides a method of utilizing a run-to-run control of deposition process more accurately set up the control systems for a particular tool. Furthermore, the present invention provides a method for acquiring production data and performing run-to-run control in response to the acquired production data.

Turning now to FIG. 1, one embodiment of the present invention is illustrated. In one embodiment, semiconductor products 105, such as semiconductor wafers are processed on processing tools 110, 112 using a plurality of control input signals on a line 120. In one embodiment, the control input signals on the line 120 are sent to the processing tools 110, 112 from a computer system 130 via machine interfaces 115, 117. In one embodiment, the computer system 130 is integrated with a manufacturing process control system (not shown), such as an Automated Process Control (APC) system. In one embodiment, the first and second machine interfaces 115, 117 are located outside the processing tools 110, 112. In an alternative embodiment, the first and second machine interfaces 115, 117 are located within the processing tools 110, 112.

In one embodiment, the computer system 130 sends control input signals on a line 120 to the first and second machine interfaces 115, 117. In one embodiment, the computer system 130 is integrated with a process control system (not shown), such as an Automated Process Control (APC) framework (not shown). In one embodiment, the computer system 130 is used to define a process script and input control that implement a particular manufacturing process. The control input signals on a line 120 that are intended for processing tool A 110 are received and processed by the first machine interface 115. The control input signals on a line 120 that are intended for processing tool B 112 are received and processed by the second machine interface 117. Examples of the processing tools 110, 112 used in semiconductor manufacturing processes are deposition process tools, such as a copper barrier layer deposition tool and a seed layer deposition tool. One of the primary features taught by the present invention is a method of detecting and organizing fault data for semiconductor manufacturing processes.

Typically, during manufacturing of semiconductor wafers, a copper deposition process is implemented. In one embodiment, a copper seed layer is generally deposited into a trench of a semiconductor wafer that is being processed by the processing tools A and B 110, 112. Once the copper seed layer is deposited, a copper barrier layer is deposited on the semiconductor wafers being processed. The depositions of the copper seed layer and the copper barrier layer is performed by one of a plurality of methods that are known to those skilled in the art.

Typically, the copper seed layer is deposited using a physical vapor deposition process or other physical deposition processes known to those skilled in the art. Typically, the deposition of the copper barrier layer is performed using chemical electroplating techniques. Among the control issues relating to copper deposition processes is size of the copper grain after deposition, and the crystal lattice orientation after deposition. The quality and accuracy of the copper grain size and the crystal lattice orientation plays a role in the quality of the finished semiconductor device.

In one embodiment, deposition of the copper barrier layer onto the semiconductor wafer being processed is performed using electroplating techniques. In one embodiment, the electroplating process used for depositing the copper barrier layer is performed utilizing a wet bath with an aqueous copper solution. In one embodiment, the wet bath used in the electroplating process comprises a plurality of chemicals that are known to those skilled in the art. An electrochemical potential is applied across a cathode (not shown) and an anode (not shown) to induce electroplating of copper onto the semiconductor wafer being processed. Among the factors that can be controlled in the deposition of copper on semiconductor wafer include concentration of copper in the aqueous copper solution, the temperature during the copper deposition process, and the electrochemical potential applied during the copper deposition process. In one embodiment, the aforementioned factors can be controlled in the deposition of copper in semiconductor wafers using a process recipe and adjusting the control input parameters on the line 120.

The control inputs on the line 120 generally affect the accuracy of the process steps performed by the processing tools 110, 112 on semiconductor wafers being processed. Modifications of the control inputs can be utilized to improve the performance of the process steps employed in the manufacturing tool 110, 112. Many times, the errors that are found in the processed semiconductor products 105 can be correlated to a particular fault analysis, and corrective actions can be taken to reduce the errors. Furthermore, corrective actions can be taken between one manufacturing run of semiconductor devices to another manufacturing run of semiconductor devices, known as fault correction of process control on a run-to-run basis.

Figure 2:
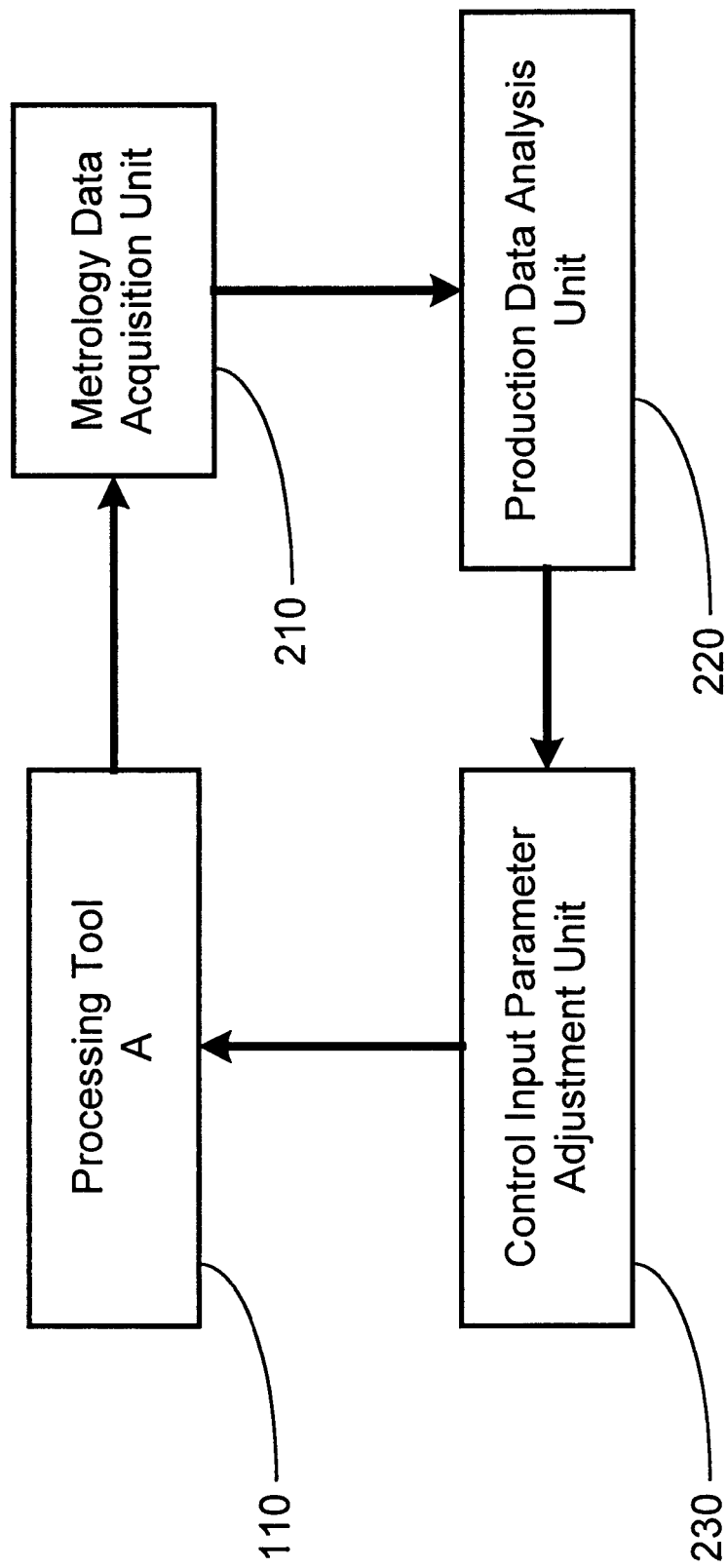
FIG. 2 illustrates one embodiment of an implementation a run-to-run control system taught by the present invention.

Turning now to FIG. 2, a block diagram representation of one embodiment of an implementation of a run-to-run control method taught by the present invention is illustrated. The processing tool A 110 is interfaced with a metrology data acquisition unit 210. In one embodiment, the metrology data acquisition unit 210 is a metrology tool that includes a scanning electron microscope used for analysis of semiconductor wafers being processed by the processing tool A 110. In an alternative embodiment, the metrology data acquisition unit 210 is a metrology tool that includes an X-ray diffraction analysis tool used for analysis of semiconductor wafers being processed by the processing tool a 110. In one embodiment, the metrology data acquisition unit 210 acquires metrology data, including production data, and sends the acquired data to the production data analysis unit 220. In one embodiment, the production data analysis unit 220 is a computer program that is interfaced with a process control system such as the APC framework.

Once the production data analysis unit 220 is used to analyze production data, control input parameters on the line 120 are modified in response to the analysis performed on the acquired production data. The control input parameters on the line 120 are modified by the control input parameter adjustment unit 230. In one embodiment, the control input parameter adjustment unit 230 is a computer software program that resides in the computer system 130 and is integrated with a process control system such as the APC framework. Once the control input parameters on the line 120 are modified, a subsequent manufacturing run of semiconductor wafers is processed by the processing tool A 110, thereby reacting to a run-to-run control. In an alternative embodiment, the system illustrated in FIG. 2 can be utilized to perform wafer-to-wafer correction during processing of semiconductor wafers.

Figure 3:
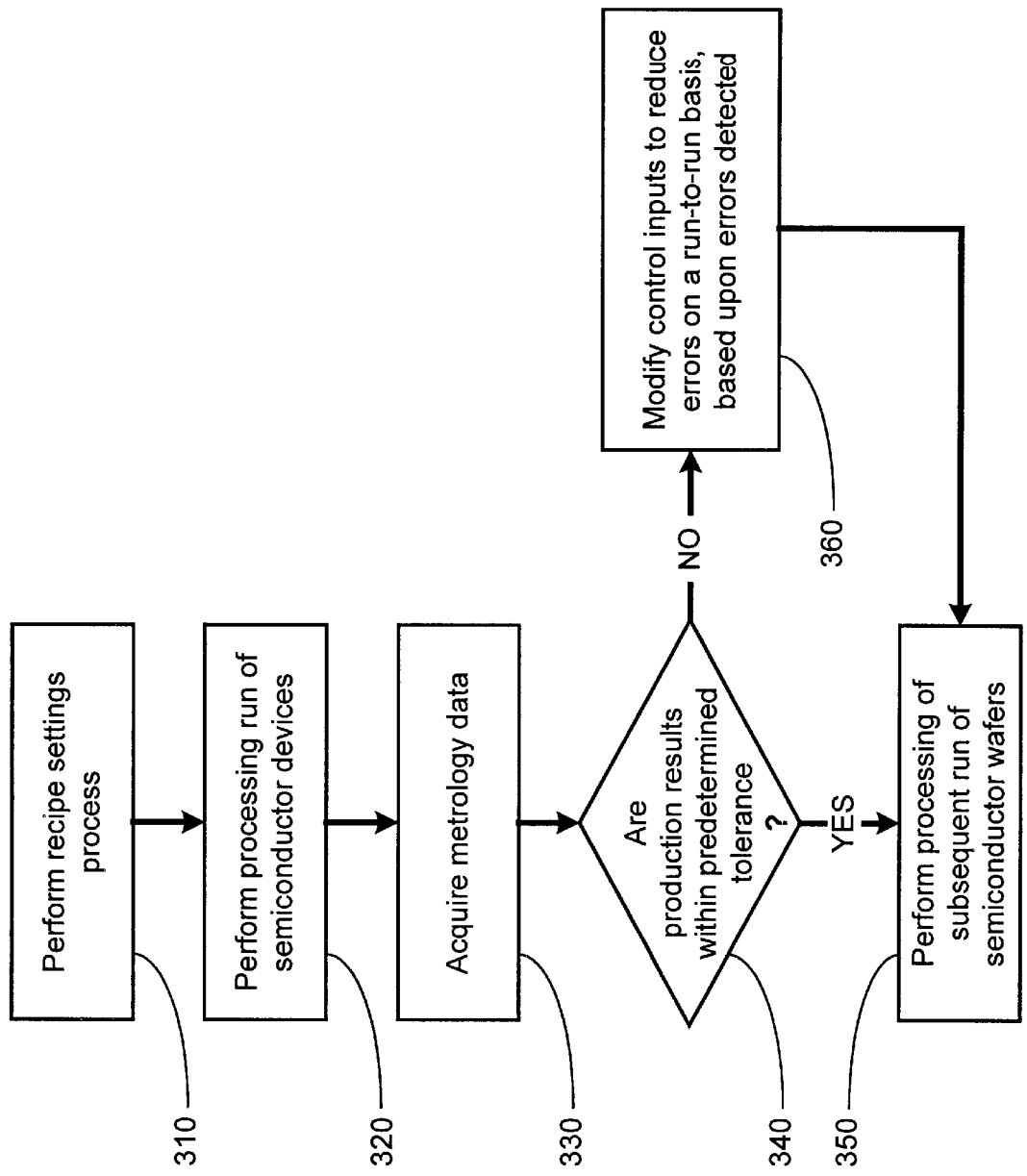
FIG. 3 illustrates a flowchart representation of the methods taught by the present invention.

Turning now to FIG. 3, a flowchart representation of the methods taught by the present invention is illustrated. A recipe setting process is performed to set the control input parameters on the line 120 that will control the processing of semiconductor wafers, as described in block 310 of FIG. 3. A manufacturing run of semiconductor devices, such as semiconductor wafers, is then processed, as described in block 320 of FIG. 3. Once a manufacturing run of semiconductor devices is processed, metrology data, including production data, is acquired, as illustrated in block 330 of FIG. 3. A flowchart depiction of a more detailed description of the step of acquiring metrology data is illustrated in FIG. 4.

Figure 4:
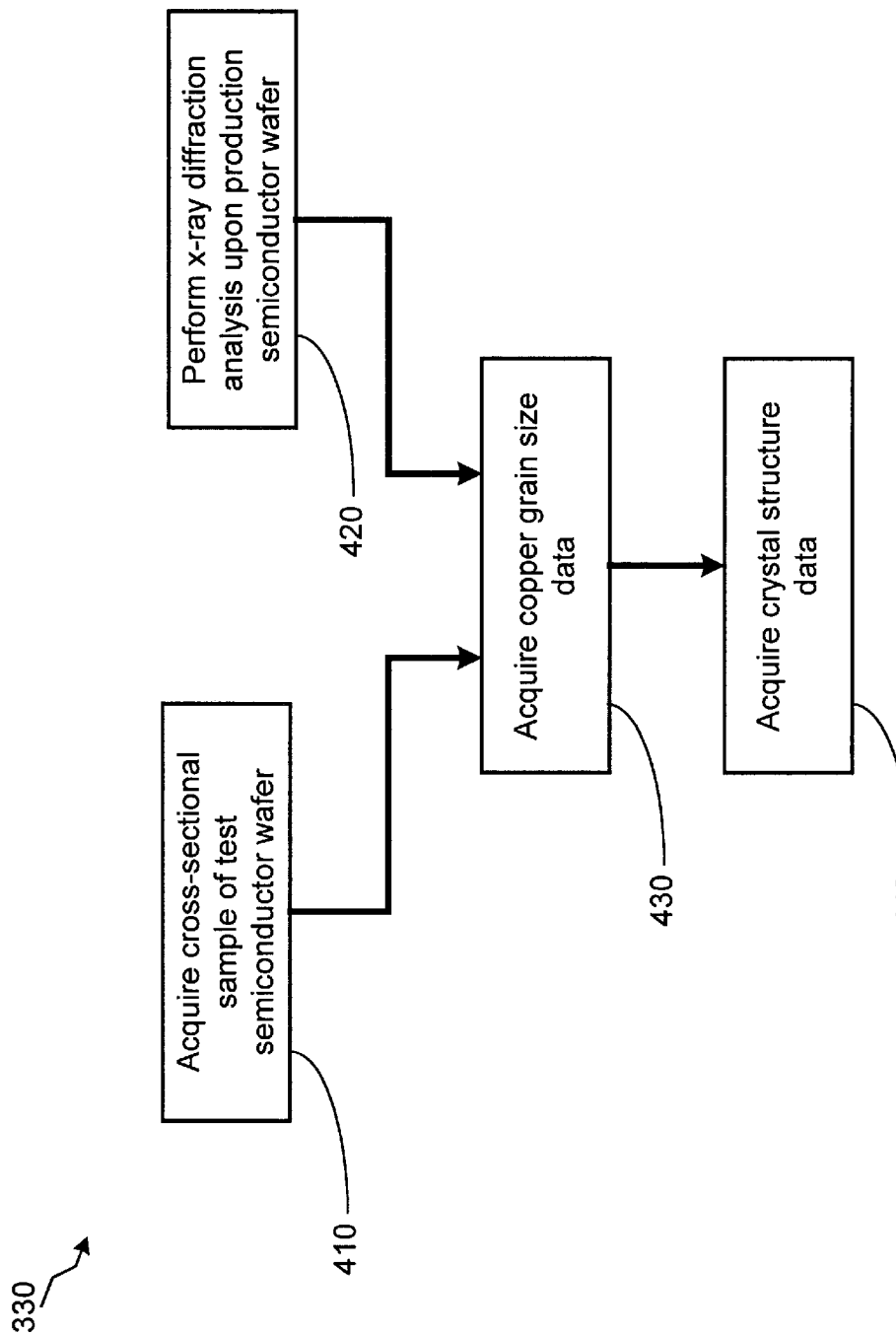
FIG. 4 illustrates a flowchart representation of a more detailed depiction of the step of acquiring metrology data described in FIG. 3.

Turning now to FIG. 4, a cross-sectional sample of a semiconductor wafer that was processed is acquired, as described in block 410. In one embodiment, the cross-sectional sample of semiconductor wafers that were processed is acquired from a test wafer since this step is a destructive metrology. In one embodiment, a scanning electron microscope is used to examine the cross-sectional sample of a processed semiconductor wafers. In an alternative embodiment, an x-ray diffraction analysis method is used to examine processed semiconductor wafers, as described in block 420 of FIG. 4.

The metrology data that is acquired includes data that relates to the copper grain size, as described in block 430 of FIG. 4. The metrology that is performed further includes acquiring data that relates to the crystal lattice orientation after the deposition of copper onto a semiconductor wafer that is being processed, as described in block 440 of FIG. 4.

Turning back to FIG. 3, once metrology data is acquired, a determination is made whether the production results relating to the manufacturing run of semiconductor devices being analyzed fall within a predetermined error tolerance, as described in block 340 of FIG. 3. In one embodiment, the analysis of the production results described in block 340, is performed by the production data analysis unit 220. When a determination is made that the production results relating to the manufacturing run of semiconductor devices being analyzed, fall within a predetermined error tolerance, a subsequent manufacturing run of semiconductor devices is initiated, as described in block 350.

When a determination is made that the production results relating to the manufacturing run of semiconductor devices being analyzed, does not fall within a predetermined error tolerance, control input parameters on the line 120 are modified to reduce errors, as described in block 360 of FIG. 3. In one embodiment, control input parameters on the line 120 are modified to reduce errors on a run-to-run basis. In an alternative embodiment, control input parameters on the line 120 are modified to reduce errors on a wafer-to-wafer basis. A flowchart depiction of a more detailed description of the step of modifying control input parameters described in block 360 of FIG. 3, is illustrated in FIG. 5.

Figure 5:
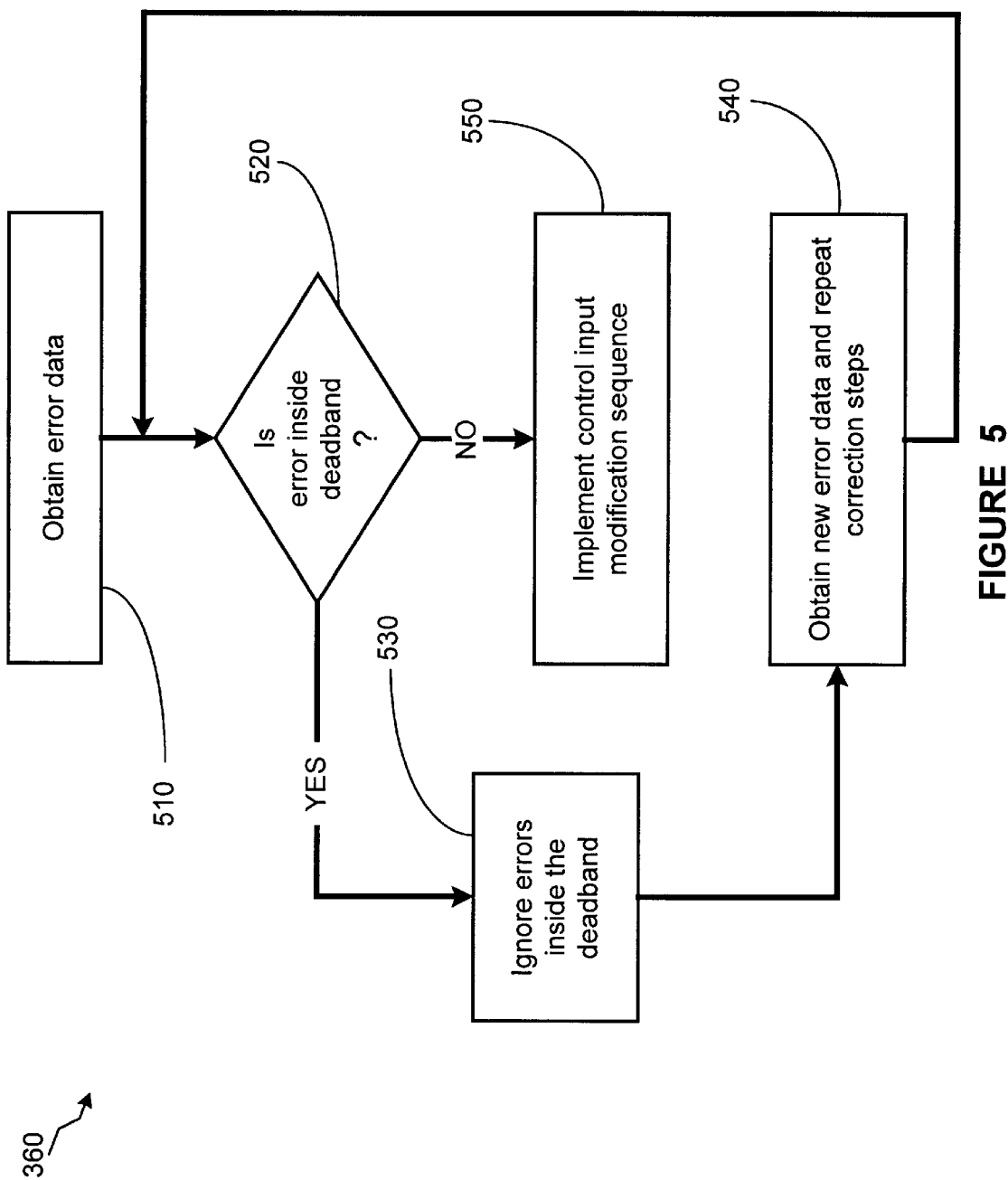
FIG. 5 illustrates a flowchart representation of a more detailed depiction of the step of modifying control input parameters described in FIG. 3.

Turning now to FIG. 5, a flowchart depiction of one method of modifying control parameters is illustrated. Error data relating to processing of semiconductor devices is acquired, as described in block 510. Once the error data is acquired, a determination is made whether the error data is inside the deadband, as described in block 520 of FIG. 5. The step described in block 520 is performed in order to determine whether an error is sufficiently significant to warrant a change in the control inputs on the line 120. To define the deadband, the errors acquired from product analysis stations (not shown), such as the review station, are compared to a predetermined set of threshold parameters. In one embodiment, the deadband contains a range of error values associated with control input signals centered proximate to a set of corresponding predetermined target values, for which generally controller action is blocked. If any one of the errors acquired from the product analysis station is smaller than its corresponding predetermined threshold value, that particular error is deemed to be in the deadband. One of the primary purposes of the deadband is to prevent excessive control actions, resulting from changes to control input signals on the line 120, from causing a semiconductor manufacturing process to be inordinately jittery.

When a determination is made, as shown in block 520, that an error corresponding to a control input signal is inside the deadband, that particular error is ignored, as described in block 530 of FIG. 5. Therefore, when the value of an error that corresponds to a control input signal is found to be in the predetermined deadband, that particular error is not used to update its corresponding control input signal. New error data is then obtained and analyzed, as described in block 540 of FIG. 5. In one embodiment, the steps described above are repeated for the new error data that is obtained.

When a determination is made, as shown in block 520, that an error corresponding to a control input signal is not inside the deadband, further processing, such as implementing a control input modification sequence, is performed, as described in block 550 of FIG. 5. The value of the error corresponding to a control input signal is used to update that control input signal for a subsequent manufacturing process step. A flowchart depiction of a more detailed description of the step of implementing a control input modification sequence is illustrated in FIG. 6.

Turning now to FIG. 6, once the error data associated with a particular control input signal is acquired, a recommended step size of the change in the value of the control input signal is calculated, as described in block 610 of FIG. 6. The step size of the change in the value of the control input signal relates to the change in the magnitude of the value of the control input signal. The magnitude of the value of the control input signal determines the input characteristics of the settings of semiconductor manufacturing tools, such as the exposure tool 210. In one embodiment, the step size, which determines the new settings of the control input signal on line 220, is calculated using Equation 1, as described in block 620 of FIG. 6.

$$\text{New setting} = \text{Old setting} - [(\text{weight}) * (\text{error value})] \quad \text{Equation 1}$$

As illustrated in Equation 1, the new setting of the control input signal on the line 220 is calculated by subtracting the magnitude of the old setting of the control input signal by the product of the weight and the error value of the control input parameters on the line 120. The weight is a predetermined parameter that is assigned to the error value of a particular control input parameter on the line 120. The weight of an error value of a control input signal generally lies between zero and one. The use of the weight of the error value of a control input signal is one method of preventing a controller of a semiconductor manufacturing tool from operating in an inordinately jittery fashion. In other words, the value of the weight can be used to at least partially control the step size of the change of the new setting from the old setting of the control input signal.

Although the value of the weight can be used to partially control the step size of the change in the setting of the control input signal, the value of the weight may still be insufficient to prevent an excessively large step size. In other words, even if an optimum weight were to be assigned to a particular error signal, a calculated step size of a change in the setting of a control input signal may be too large, such that it could cause a controller of a semiconductor manufacturing tool to perform in an excessively jittery fashion. Therefore, the calculated step size is compared to a predetermined maximum step size that is allowable for the change in setting of a control input parameter on the line 120, as described in block 630 of FIG. 6.

When a determination is made that the calculated step size of the change in the magnitude of the control input signal is smaller than the predetermined maximum step size, the calculated step size is used to compute the new settings of the control input signal. When a determination is made that the calculated step size of the change in the magnitude of the control input signal is larger than the predetermined maximum step size, the predetermined maximum step size is used to compute the new settings of the control input signal. Based upon the calculation of the step size of the new settings of the control input parameter on the line 120, the control input signal is updated for the next manufacturing process step, as described in block 640 of FIG. 6.

The completion of the step described in block 640 concludes the step of implementing the control input modification sequence, as described in block 550 of FIG. 5. New error data for other control input signals is acquired and corrected using the steps described above. Once the relevant control input signals for a semiconductor manufacturing tool are updated, the control input signals with new, more accurate settings are used to perform a semiconductor manufacturing process step for a subsequent manufacturing run of semiconductor devices, as described in block 350 of FIG. 3. The principles taught by the present invention can be implemented into other types of manufacturing frameworks.

The principles taught by the present invention can be implemented in an Advanced Process Control (APC) Framework. The APC is a preferred platform from which to implement the overlay control strategy taught by the present invention. In some embodiments, the APC can be a factory-wide software system, therefore, the control strategies taught by the present invention can be applied to virtually any of the semiconductor manufacturing tools on the factory floor. The APC framework also allows for remote access and monitoring of the process performance. Furthermore, by utilizing the APC framework, data storage can be more convenient, more flexible, and less expensive than local drives. The APC platform allows for more sophisticated types of control because it provides a significant amount of flexibility in writing the necessary software code. Deployment of the control strategy taught by the present invention onto the APC framework could require a number of software components. In addition to components within the APC framework, a computer script is written for each of the semiconductor manufacturing tools involved in the control system. When a semiconductor manufacturing tool in the control system is started in the semiconductor manufacturing fab, it generally calls upon a script to initiate the action that is required by the process controller, such as the overlay controller. The control methods are generally defined and performed in these scripts. The development of these scripts can comprise a significant portion of the development of a control system.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention.

Accordingly, the protection sought herein is as set forth in the claims below.

What is claimed is:

1. A method for controlling a deposition process in a manufacturing process, comprising:

performing a process recipe setting step;

performing a process run of semiconductor devices based upon said process recipe;

acquiring metrology data relating to said process run of semiconductor devices;

determining whether production results are within a predetermined tolerance level, based upon said metrology data; and modifying said process recipe setting in response to a determination that said production results are within a predetermined tolerance level for processing a subsequent semiconductor device, based upon said metrology data, modifying said process recipe setting comprises modifying a control input parameter based upon a comparison between a maximum step size and a calculated step size to determine the step size of the change made to said control input parameter.

2. The method described in claim 1, wherein performing a process recipe setting step further comprises setting a value of at least one control input parameter.

3. The method described in claim 1, wherein performing a process run of semiconductor devices further comprises performing a process run of semiconductor wafers.

4. The method described in claim 1, wherein performing a process run of semiconductor devices further comprises performing a deposition process upon said semiconductor devices.

5. The method described in claim 4, wherein performing a process run of semiconductor devices further comprises performing a copper deposition process upon said semiconductor devices.

6. The method described in claim 5, wherein performing a process run of semiconductor devices further comprises performing a copper barrier layer deposition process upon said semiconductor devices.

7. The method described in claim 5, wherein performing a process run of semiconductor devices further comprises performing a copper seed layer deposition process upon said semiconductor devices.

8. The method described in claim 1, wherein acquiring metrology data relating to said process run of semiconductor devices further comprises acquiring data relating to a size of copper grain.

9. The method described in claim 1, wherein acquiring metrology data relating to said process run of semiconductor devices further comprises acquiring data relating to a crystal lattice orientation.

10. The method described in claim 1, wherein acquiring metrology data relating to said process run of semiconductor devices further comprises acquiring production data from manufacturing of semiconductor devices.

11. The method described in claim 1, wherein acquiring metrology data relating to said process run of semiconductor devices further comprises acquiring metrology data using a scanning electron microscope.

12. The method described in claim 1, wherein acquiring metrology data relating to said process run of semiconductor devices further comprises acquiring metrology data using a x-ray diffraction method.

13. The method described in claim 1, wherein modifying said process recipe setting further comprises modifying at least one control input parameter used for manufacturing of semiconductor devices.

14. The method described in claim 13, wherein modifying at least one control input parameter further comprises modifying a concentration level of copper in a copper deposition process.

15. The method described in claim 13, wherein modifying at least one control input parameter further comprises modifying a temperature setting during a copper deposition process.

16. The method described in claim 13, wherein modifying at least one control input parameter further comprises modifying an electrochemical potential used during a copper deposition process.

17. The method described in claim 13, wherein modifying said process recipe setting further comprises:
obtaining error data;
determining whether a value of said error data is inside a deadband;
ignoring said error data in response to a determination that said value of error data is inside said deadband; and
implementing a control input modification sequence in response to a determination that said value of error data is not inside said deadband.

18. The method described in claim 17, wherein implementing a control input modification sequence further comprises:
calculating a recommended step size in response to said error data;
determining a maximum step size;
comparing said calculated step size to said maximum step size; and
updating at least one control input signal in response to said comparison of said calculated step size to said maximum step size.

19. The method described in claim 18, wherein calculating a recommended step size further comprises calculating said recommended step size using a controller equation.

20. The method described in claim 18, wherein updating at least one control input signal in response to said comparison of said calculated step size to said maximum step size further comprises using said calculated step size to update said control input signal in response to a determination that said calculated step size is smaller than the said maximum step size.

21. The method described in claim 18, wherein updating at least one control input signal in response to said comparison of said calculated step size to said maximum step size further comprises using said maximum step size to update said control input signal in response to a determination that said calculated step size is larger than the said maximum step size.

22. The method described in claim 18, wherein updating at least one control input signal in response to said comparison of said calculated step size to said maximum step size further comprises updating said control input signal on a run-to-run basis.

23. The method described in claim 1, wherein updating at least one control input signal in response to said comparison of said calculated step size to said maximum step size further comprises updating said control input signal on a wafer-to-wafer basis.

24. An apparatus for controlling a deposition process in a manufacturing process, comprising:
a processing tool capable of receiving at least one control input parameter and processing a semiconductor device;
a metrology data acquisition unit interfaced with said processing tool and capable of acquiring metrology data from said processing tool;
a production data analysis unit interfaced with said metrology data acquisition unit and capable of analyzing said metrology data from said metrology data acquisition unit; and
a control input parameter adjustment unit interfaced with said production data analysis unit and said processing tool and being capable of performing adjustments upon said control input parameter to process a subsequent semiconductor device, based upon a comparison between a maximum step size and a calculated step size to determine the step size of the change made to said control input parameter.

25. The apparatus described in claim 24, wherein said processing tool is a deposition tool for manufacturing of semiconductor devices.

26. The apparatus described in claim 24, wherein said processing tool is a copper deposition tool for manufacturing of semiconductor devices.

27. The apparatus described in claim 24, wherein said metrology data acquisition unit is a metrology tool.

28. The apparatus described in claim 27, wherein said metrology tool comprises a scanning electron microscope.

29. The apparatus described in claim 27, wherein said metrology tool comprises a x-ray diffraction analysis tool.

30. The apparatus described in claim 24, wherein said production data analysis unit is integrated with a process control system.

31. The apparatus described in claim 30, wherein said control input parameter adjustment unit is integrated with a process control system.

32. The apparatus described in claim 31, wherein said process control system is an automated process control framework.

33. An apparatus for controlling a deposition process in a manufacturing process, comprising:

means for performing a process recipe setting step;

means for performing a process run of semiconductor devices based upon said process recipe;

means for acquiring metrology data relating to said process run of semiconductor devices;

means for determining whether production results are within a predetermined tolerance level, based upon said metrology data; and means for modifying said process recipe setting in response to a determination that said production results are within a predetermined tolerance level for processing a subsequent semiconductor device, based upon said metrology data means for modifying said process recipe setting comprises means for modifying a control input parameter based upon a comparison between a maximum step size and a calculated step size to determine the step size of the change made to said control input parameter.

34. A system for controlling a deposition process in a manufacturing process, comprising:

a processing tool capable of receiving at least one control input parameter, for processing a semiconductor device;

a metrology data acquisition unit interfaced with said processing tool and capable of acquiring metrology data from said processing tool;

a production data analysis unit interfaced with said metrology data acquisition unit and capable of analyzing said metrology data from said metrology data acquisition unit; and a control input parameter adjustment unit interfaced with said production data analysis unit and said processing tool and being capable of performing adjustments upon said control input parameter for processing a subsequent semiconductor device, based upon a comparison between a maximum step size and a calculated step size to determine the step size of the change made to said control input parameter.

35. A computer readable program storage device encoded with instructions that, when executed by a computer, performs a method for controlling a deposition process in a manufacturing process, comprising:

performing a process recipe setting step;

performing a process run of semiconductor devices based upon said process recipe;

acquiring metrology data relating to said process run of semiconductor devices;

determining whether production results are within a predetermined tolerance level, based upon said metrology data; and modifying said process recipe setting in response to a determination that said production results are within a predetermined tolerance level for processing a subsequent semiconductor device, based upon said metrology data modifying said process recipe setting comprises modifying a control input parameter based upon a comparison between a maximum step size and a calculated step size to determine the step size of the change made to said control input parameter.

36. The computer readable program storage device encoded with instructions that, when executed by a computer, performs the method described in claim 35, wherein performing a process recipe setting step further comprises setting a value of at least one control input parameter.

37. The computer readable program storage device encoded with instructions that, when executed by a computer, performs the method described in claim 35, wherein performing a process run of semiconductor devices further comprises performing a process run of semiconductor wafers.

38. The computer readable program storage device encoded with instructions that, when executed by a computer, performs the method described in claim 35, wherein performing a process run of semiconductor devices further comprises performing a deposition process upon said semiconductor devices.

39. The computer readable program storage device encoded with instructions that, when executed by a computer, performs the method described in claim 38, wherein performing a process run of semiconductor devices further comprises performing a copper deposition process upon said semiconductor devices.

40. The computer readable program storage device encoded with instructions that, when executed by a computer, performs the method described in claim 39, wherein performing a process run of semiconductor devices further comprises performing a copper barrier layer deposition process upon said semiconductor devices.

41. The computer readable program storage device encoded with instructions that, when executed by a computer, performs the method described in claim 39, wherein performing a process run of semiconductor devices further comprises performing a copper seed layer deposition process upon said semiconductor devices.

42. The computer readable program storage device encoded with instructions that, when executed by a computer, performs the method described in claim 35, wherein acquiring metrology data relating to said process run of semiconductor devices further comprises acquiring data relating to a size of copper grain.

43. The computer readable program storage device encoded with instructions that, when executed by a computer, performs the method described in claim 35, wherein acquiring metrology data relating to said process run of semiconductor devices further comprises acquiring data relating to a crystal lattice orientation.

44. The computer readable program storage device encoded with instructions that, when executed by a computer, performs the method described in claim 35, wherein acquiring metrology data relating to said process run of semiconductor devices further comprises acquiring production data from manufacturing of semiconductor devices.

45. The computer readable program storage device encoded with instructions that, when executed by a computer, performs the method described in claim 35, wherein acquiring metrology data relating to said process run of semiconductor devices further comprises acquiring metrology data using a scanning electron microscope.

46. The computer readable program storage device encoded with instructions that, when executed by a computer, performs the method described in claim 35, wherein acquiring metrology data relating to said process run of semiconductor devices further comprises acquiring metrology data using a x-ray diffraction method.

47. The computer readable program storage device encoded with instructions that, when executed by a computer, performs the method described in claim 35, wherein modifying said process recipe setting further comprises modifying at least one control input parameter used for manufacturing of semiconductor devices.

48. The computer readable program storage device encoded with instructions that, when executed by a computer, performs the method described in claim 47, wherein modifying at least one control input parameter further comprises modifying a concentration level of copper in a copper deposition process.

49. The computer readable program storage device encoded with instructions that, when executed by a computer, performs the method described in claim 47, wherein modifying at least one control input parameter further comprises modifying a temperature setting during a copper deposition process.

50. The computer readable program storage device encoded with instructions that, when executed by a computer, performs the method described in claim 47, wherein modifying at least one control input parameter further comprises modifying an electrochemical potential used during a copper deposition process.

51. The computer readable program storage device encoded with instructions that, when executed by a computer, performs the method described in claim 47, wherein modifying said process recipe setting further comprises:

obtaining error data;

determining whether a value of said error data is inside a deadband;

ignoring said error data in response to a determination that said value of error data is inside said deadband; and implementing a control input modification sequence in response to a determination that said value of error data is not inside said deadband.

52. The computer readable program storage device encoded with instructions that, when executed by a computer, performs the method described in claim 51, wherein implementing a control input modification sequence further comprises:

calculating a recommended step size in response to said error data;

determining a maximum step size;

comparing said calculated step size to said maximum step size; and updating at least one control input signal in response to said comparison of said calculated step size to said maximum step size.

53. The computer readable program storage device encoded with instructions that, when executed by a computer, performs the method described in claim 52, wherein calculating a recommended step size further comprises calculating said recommended step size using a controller equation.

54. The computer readable program storage device encoded with instructions that, when executed by a computer, performs the method described in claim 52, wherein updating at least one control input signal in response to said comparison of said calculated step size to said maximum step size further comprises using said calculated step size to update said control input signal in response to a determination that said calculated step size is smaller than the said maximum step size.

55. The computer readable program storage device encoded with instructions that, when executed by a computer, performs the method described in claim 52, wherein updating at least one control input signal in response to said comparison of said calculated step size to said maximum step size further comprises using said maximum step size to update said control input signal in response to a determination that said calculated step size is larger than the said maximum step size.

56. The computer readable program storage device encoded with instructions that, when executed by a computer, performs the method described in claim 52, wherein updating at least one control input signal in response to said comparison of said calculated step size to said maximum step size further comprises updating said control input signal on a run-to-run basis.

57. The computer readable program storage device encoded with instructions that, when executed by a computer, performs the method described in claim 35, wherein updating at least one control input signal in response to said comparison of said calculated step size to said maximum step size further comprises updating said control input signal on a wafer-to-wafer basis.

\* \* \* \* \*

UNITED STATES PATENT AND TRADEMARK OFFICE
CERTIFICATE OF CORRECTION

PATENT NO. : 6,650,957 B1
DATED : November 18, 2003
INVENTOR(S) : William J. Campbell, Thomas J. Sonderman and Craig W. Christian It is certified that error appears in the above-identified patent and that said Letters Patent is hereby corrected as shown below:

<u>Title page,</u>
Item [57], ABSTRACT,
Line 5, replace "dev" with -- devices is acquired. A --.

<u>Column 11,</u>
Line 34, replace "data" with -- data, --.

<u>Column 12,</u>
Line 10, replace "data" with -- data, --.

Signed and Sealed this

Twenty-fourth Day of February, 2004

JON W. DUDAS
*Acting Director of the United States Patent and Trademark Office*